United States Patent [19]

Moore

[11] 3,855,386

[45] Dec. 17, 1974

[54] CATALYTIC FUSED SALT EXTRACTION PROCESS FOR REMOVAL OF SULFUR OXIDES FROM FLUE OR OTHER GASES

[75] Inventor: Raymond H. Moore, Richland, Wash.

[73] Assignee: Battelle Memorial Institute, Richland, Wash.

[22] Filed: Dec. 4, 1972

[21] Appl. No.: 311,471

Related U.S. Application Data

[63] Continuation-in-part of Ser. No. 201,275, Nov. 23, 1971, abandoned.

[52] U.S. Cl.............. 423/210.5, 204/61, 423/244, 423/532
[51] Int. Cl...... B01d 47/00, B01j 9/04, C01b 17/00
[58] Field of Search .......................... 423/242–244, 423/532, 533, 535, 538, 210.5; 204/61

[56] References Cited
UNITED STATES PATENTS

| | | | |
|---|---|---|---|
| 2,381,908 | 8/1945 | Hurt et al. ........................ | 423/535 |
| 3,362,786 | 1/1968 | Burkhardt ......................... | 423/535 |
| 3,510,259 | 5/1970 | Everett ............................. | 423/52 |
| 3,552,921 | 1/1971 | Blytas .............................. | 423/242 |
| 3,607,001 | 9/1971 | Zinfer et al. ..................... | 423/242 |

*Primary Examiner*—Earl C. Thomas
*Assistant Examiner*—Gregory A. Heller
*Attorney, Agent, or Firm*—Wells, St. John & Roberts

[57] ABSTRACT

A continuous catalytic fused salt extraction process is described for removing sulfur oxides from gaseous streams. The gaseous stream is contacted with a molten liquid potassium sulfate salt mixture at a temperature below 500° C. having dissolved $V_2O_5$ to catalytically oxidize sulfur dioxide to sulfur trioxide and molten potassium normal sulfate to solvate the sulfur trioxide to remove the sulfur trioxide from the gaseous stream. A portion of the sulfur trioxide loaded salt mixture is then placed in an electrolytic cell and with an electrical potential applied between an anode and a cathode to fume the $SO_3$ solute and form a high purity offgas of $SO_3$ and regenerate the molten potassium normal sulfate. The evolved $SO_3$ may be used directly to yield a variety of useful sulfur by-products including liquid sulfur trioxide, sulfuric acids and oleums of any concentrations, liquid sulfur dioxide and elemental sulfur.

7 Claims, 1 Drawing Figure

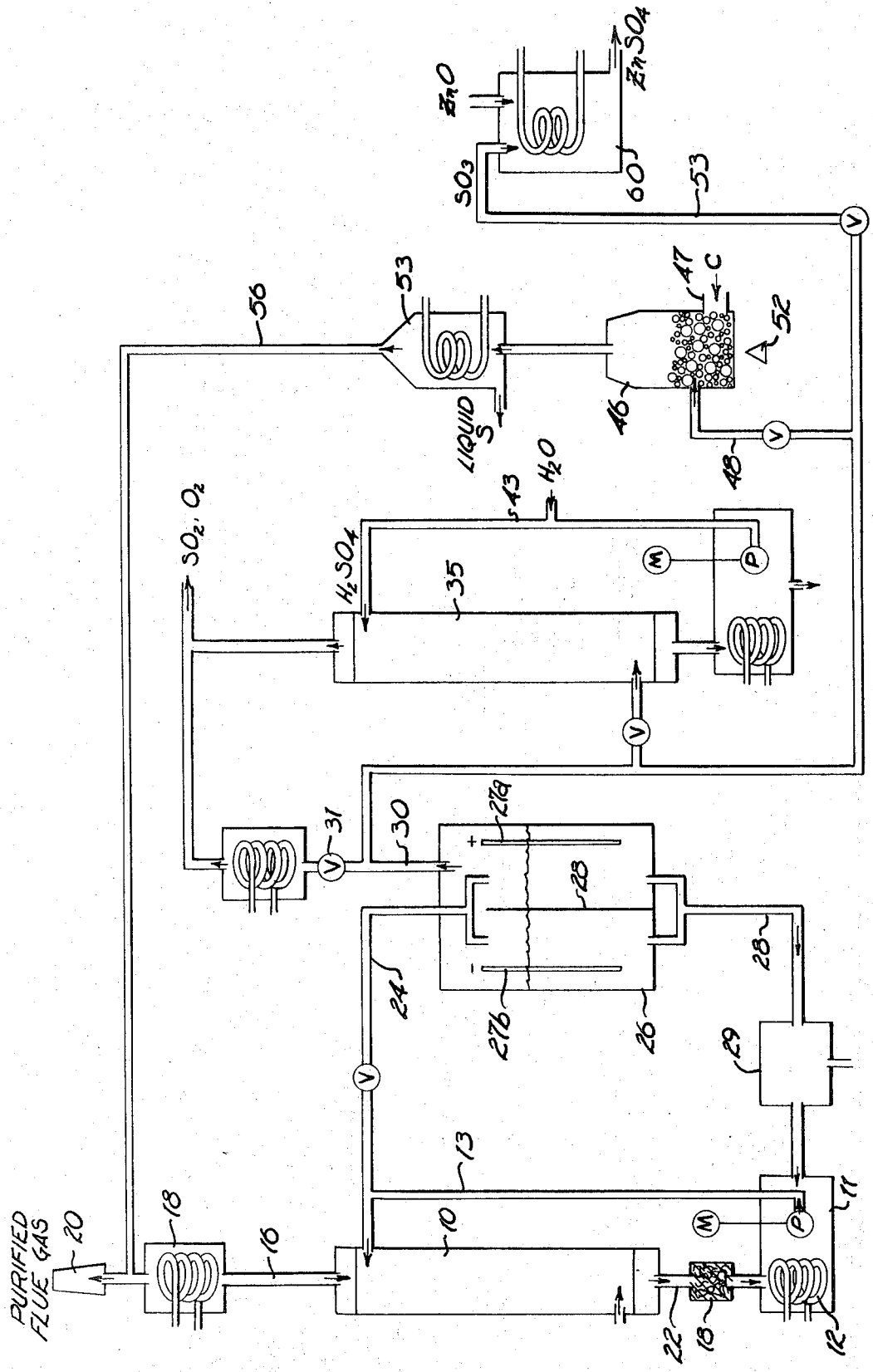

1

CATALYTIC FUSED SALT EXTRACTION PROCESS FOR REMOVAL OF SULFUR OXIDES FROM FLUE OR OTHER GASES

RELATED APPLICATION

This is a continuation-in-part application of a parent copending application, Ser. No. 201,275 filed Nov. 23, 1971 now abandoned.

BACKGROUND OF THE INVENTION

This invention relates to processes for removal of sulfur oxides from gaseous streams and more particularly to catalytic fused salt extraction processes for removing sulfur dioxide and sulfur trioxide from flue or other gases.

Sulfur oxides, principally sulfur dioxide, are present in rather dilute amounts in the combustion waste gases discharged from many metal refining, chemical, pulp, oil refining plants and in the flue gases from power plants generating electricity by the combustion of fossil fuels. Although the flue gases are rather dilute in sulfur oxides, the enormous volumes generated present a major environmental air pollution problem. A control of air pollution resulting from this discharge of sulfur oxides into the atmosphere has become increasingly urgent. Although there has been a major effort directed at the removal of sulfur oxides from dilute flue gases particularly from combustion processes both in the United States and in many foreign countries, commercially proven technology for such control processes does not exist. To make the removal process economical, it is necessary to form commercially saleable sulfur products, such as elementary sulfur or sulfuric acid in a manner that is economical so that the total cost of removing sulfur oxides from flue gases is minimized. Both elementary sulfur and sulfuric acid sell for relatively low figures and it has been very difficult to devise processes for efficiently removing sulfur oxides from flue gases while at the same time converting the removed sulfur oxides to produce sulfur by-products of commercial value.

Thus, it is necessary to devise a process having relatively low capitalization cost and one which may be operated very economically to transfer a pollution problem into a valuable by-product production at the lowest possible total cost.

U.S. Pat. No. 3,552,921 granted to E. C. Blytas on Jan. 5, 1971 describes a catalytic fused salt extraction process, utilizing essentially a molten salt of potassium sulfate and potassium pyrosulfate at a temperature below 550° C to remove sulfur dioxide from the flue gases. The extraction process forms a pyrosulfate-rich salt solution. To regenerate the molten salt, the pyrosulfate-rich solution is heated to a temperature above 600° C to reverse the process and form potassium sulfate and sulfur trioxide. At temperatures above 600° the molten salt is very corrosive, requiring very expensive retort liners.

An object of this invention is to provide such an efficient sulfur dioxide removal process in which the absorption salt may be regenerated without having to heat the salt to such high temperatures.

Another object of this invention is to provide a catalytic fused salt extraction process in which the fused salt is regenerated without the consumption of raw materials and without the necessity of providing expensive retort liners.

An additional object of this invention is to provide an efficient process for removing sulfur oxides from flue gases and recovery of valuable sulfur by-products with a rather small capital expenditure on equipment and requiring a minimum of operational cost.

Still another object of this invention is to provide an efficient process for removing sulfur oxides from flue gases and forming concentrated operational flexibility as to which sulfur by-products are produced.

These and other objects and advantages of this invention will become apparent upon the reading of the following detailed description of a preferred embodiment.

BRIEF DESCRIPTION OF THE DRAWING

A preferred embodiment of this invention is illustrated in the accompanying drawing showing a schematic flow diagram of the process.

DESCRIPTION OF THE PREFERRED EMBODIMENT

The present invention is particularly adaptable to the removal of sulfur oxides from hot combustion gases obtained by the burning of sulfur containing fossil fuels, such as those produced in the operation of electric generation plants. However, it should be appreciated that the invention is also adaptable to the treatment of a wide range of gaseous streams containing sulfur oxides including organic sulfur oxides. Included in such gaseous streams are those emitted from various chemical, pulp, oil and metal refining operations. This invention is particularly applicable to gaseous streams containing $SO_2$ concentrations ranging from 0.01 volume percent to as high as 20 volume percent. The progress is not substantially affected by other gaseous components such as chlorine, ammonia, water vapor, nitrogen, nitrous oxides or carbon dioxide common to flue gases and the like.

Broadly, the first step of this process is contacting the gaseous stream containing the sulfur oxides with a molten liquid homogeneous catalyst extraction salt mixture at a temperature below 500° C. in which the molten liquid salt mixture comprises a dissolved oxygen compound of vanadium to catalytically oxidize sulfur dioxide to sulfur trioxide and an extractant of molten potassium normal sulfate ($K_2SO_4$) to react with the sulfur trioxide to form molten potassium pyrosulfate thereby solvating the sulfur trioxide and forming a sulfur dioxide depleted gaseous stream and a sulfur trioxide loaded molten liquid salt mixture. More specifically, as illustrated in the drawing, the flue gas is directed to a contactor 10 where the flue gas is contacted countercurrently with the molten liquid salt mixture. The molten liquid homogeneous catalyst extraction salt mixture is contained in a storage vessel 11 which is suitably insulated and equipped with a heating/cooling element 12 to maintain the molten salt mixture in liquid phase at a preferred temperature between 400° and 500° C. The molten liquid salt solution is circulated from the storage vessel to the contactor 10 through line 13. Many of the various well-known contact methods and equipment may be utilized as the contactor 10 to insure rapid oxidation of the sulfur dioxide and the rapid solvation of the sulfur trioxide. Examples of such contactors include packed columns, wetted wall contactors, spray towers, or absorbers containing perforated plates, screens or bubble cap trays.

As mentioned, the molten liquid homogeneous catalyst extraction salt mixture contains a catalytically active, oxygenated compound of vanadium to catalytically oxidize sulfur dioxide to sulfur trioxide. Preferably, the oxygen compound of vanadium is vanadium pentoxide ($V_2O_5$) and is included in operable amounts of up to 20 mole percent of the total mixture. Preferably the vanadium pentoxide concentration should be between 5 and 15 mole percent. The catalytic reaction (1) may be written as follows:

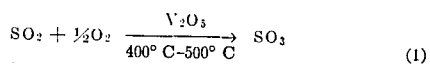

$$SO_2 + \tfrac{1}{2}O_2 \xrightarrow[400° C-500° C]{V_2O_5} SO_3 \qquad (1)$$

A principal feature of this invention is a provision that the molten liquid homogeneous catalyst extraction salt mixture contain an active extractant of liquid potassium normal sulfate ($K_2SO_4$) to solvate the sulfur trioxide in the molten liquid salt solution to form liquid potassium pyrosulfate ($K_2S_2O_7$) to remove the sulfur trioxide from the gaseous stream. The solvation reaction (2) may be written as follows:

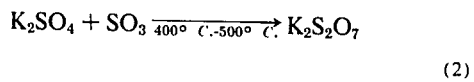

$$K_2SO_4 + SO_3 \xrightarrow[400° C-500° C]{} K_2S_2O_7 \qquad (2)$$

An important third component of the molten homogeneous catalyst extraction salt mixture is potassium pyrosulfate ($K_2S_2O_7$). Other non-reactive molten sulfate salts may be included with the potassium sulfates to serve as inexpensive inert diluants although a three component molten solution consisting essentially of vanadium pentoxide, potassium normal sulfate and potassium pyrosulfate is preferred. Small amounts of potassium bisulfate may on occasion be present. Lithium and sodium normal sulfates are unacceptable as solvating agents, however they may be present as diluants without poisoning the oxidation and solvation.

The molten solution is operable over a wide range of potassium sulfate ($K_2SO_4$ and $K_2S_2O_7$) mixture compositions. It is necessary that the salt mixture have a melting point less than 400° C. and have a potassium normal sulfate content greater than the stoichiometric equivalent of the sulfur oxides in the flue gases. It is economically impractical to determine by experimentation the full range of potassium sulfate mixture compositions and all the possible non-reactive diluants that could possibly be used for all situations. A suitable composition range, in mole percent, consists of 60–80 potassium pyrosulfate; 5–20 potassium normal sulfate and 5–20 vanadium pentoxide.

It should be understood that the catalyst extractant salt mixture is maintained in a molten liquid state which is capable of liquid flow as a body. It should also be understood that the salt mixture is not supported on an inert carrier such as those dispersed on or absorbed in such inert materials such as silica gel, kieselguhr or silica alumina. Any solid material such as fly ash or other particulates normal to flue gases contained in the liquid salt mixture would be disposed in the liquid continuous phase and carried as entrained solids.

It has been found that by maintaining the temperature of the molten liquid mixture in contact with the gaseous stream between 400° C. and 500° C. that over 75 percent of the sulfur oxides ($SO_2$ and $SO_3$) can be removed from the gaseous stream. It has been further found that removal efficiencies of greater than 98 percent can be obtained by maintaining the contact temperature of the molten liquid mixture between 425° C. and 460° C. and this is the optimum range. The molten solution is capable of being loaded with the sulfur oxides in stoichiometric relation to the content of the potassium normal sulfate therein according to formula (2).

The molten liquid salt mixture, not only removes the sulfur oxides from the flue gas, but it also serves as a scrubbing agent to remove much of the fly ash from the flue gas in the unit 10. The effectiveness of the molten salt mixture is not materially affected by fly ash or other entrained insoluble solids of small particulate size.

From the contactor 10, it may be desirable to first pass the sulfur dioxide depleted gaseous stream through a low pressure drop mist eliminator to remove any entrained liquid. The sulfur dioxide depleted flue gas is then passed to a stack 20 for emission to the atmosphere.

A very important step of this invention is to separate the catalytic molten potassium sulfate salt mixture from the gaseous stream before the molten liquid salt mixture becomes saturated with sulfur trioxide. Stated another way — the process includes the step of removing the catalytic molten potassium sulfate salt mixture from the gaseous stream before the potassium normal sulfate in the mixture is depleted and entirely converted to potassium pyrosulfate. Preferably, the molten salt mixture should be separated from the gaseous stream before the potassium normal sulfate falls below 5 mole percent of the total mixture.

The sulfur trioxide loaded molten liquid potassium salt mixture is continuously circulated from the contactor 10 to the storage vessel 11 through return line 22 to separate the sulfur trioxide loaded molten salt mixture from the gaseous stream.

The entrained solids such as fly ash may be removed by filtration to prevent particle build-up in a continuous circulating system. Filter 18 is shown in line 22 to remove the entrained solids.

An additional important step of this process is the regeneration of the molten potassium normal sulfate by electrolytically decomposing at least a portion of the potassium pyrosulfate to gaseous sulfur trioxide and potassium normal sulfate.

A portion of the sulfur trioxide loaded molten salt solution from the storage vessel 11 is bled through a bleed line 24 to a electrolytic regenerator or cell 26 wherein the sulfur trioxide loaded molten solution is subjected to an electrical potential between an anode 27a and a cathode 27b to reduce at least a portion of the potassium pyrosulfate to sulfur trioxide and potassium normal sulfate to evolve the sulfur trioxide solute as a gaseous effluent and to regenerate the extractant — potassium normal sulfate. The sulfate regeneration formulae (3) are as follows:

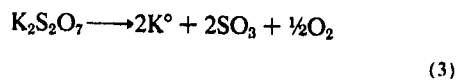

$$K_2S_2O_7 \longrightarrow 2K° + 2SO_3 + \tfrac{1}{2}O_2 \qquad (3)$$

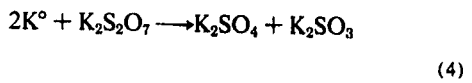

$$2K° + K_2S_2O_7 \longrightarrow K_2SO_4 + K_2SO_3 \qquad (4)$$

The anode reactions are:

$$S_2O_7^{-2} \rightarrow 2SO_3\uparrow + \tfrac{1}{2}O_2\uparrow + 2e \tag{5}$$

$$SO_4^{-2} \rightarrow SO_3 + \tfrac{1}{2}O_2 + 2e \tag{6}$$

The cathode reaction is:

$$2K^+ \rightarrow 2K° - 2e \tag{7}$$

It is desirable to place a barrier 27c between the cathode and anode to minimize the reformation of potassium pyrosulfate from the sulfur trioxide liberated at the anode and the potassium normal sulfate being generated at the cathode. Preferably the barrier is constructed of a porous ceramic membrane to limit intermixing of the anolyte and catholyte. Potassium ions from the anolyte are attracted through the membrane toward the cathode, where they react to decompose the pyrosulfate in accordance with formula (4).

The regenerated molten potassium normal sulfate salt mixture is recycled from the electrolytic cell 26 back to the storage vessel 11 through line 28. Prior to recycling the regenerated molten potassium normal sulfate, it may be desirable to purge the molten salt with air or oxygen to oxidize any oxygen deficient vanadium or potassium compounds as follows:

$$K_2SO_3 + \tfrac{1}{2}O_2 \rightarrow K_2SO_4 \tag{8}$$

$$V_2O_4 + \tfrac{1}{2}O_2 \rightarrow V_2O_5 \tag{9}$$

The generated fumes are substantially pure sulfur trioxide and oxygen. Assuming 100 percent current efficiency reaction (5) will produce one mole (86 grams) of sulfur trioxide for an expenditure of 26.8 ampere hours of electrical energy. Approximately one mole of sulfur trioxide will be produced for an expenditure of 53.6 ampere hours of electrical energy under reaction (6).

It should be noted that no reactive materials are required to contact the sulfur trioxide loaded liquid salt mixture to regenerate the molten potassium normal sulfate salt mixture. The liberated sulfur trioxide is exhausted from the reactor 26 through an effluent line 30.

It should also be noted that the process is quite versatile in that the sulfur trioxide effluent may be used directly to yield a variety of useful by-products including sulfur trioxide itself, sulfuric acid and oleums of any concentration, liquid sulfur dioxide and oxygen, all without need for purchased raw materials. Elemental sulfur may be produced without any new wastes being produced. In the schematic flow diagram a valve 31 is mounted in the effluent line 30 to direct the sulfur trioxide to a decomposition reactor 32.

In the decomposition reactor 32 the gaseous sulfur trioxide is heated to decompose the sulfur trioxide to sulfur dioxide and oxygen according to the formula:

$$SO_3 \xrightarrow{heat} SO_2 + \tfrac{1}{2}O_2 \tag{10}$$

The $SO_2$ can be compressed and liquified to provide a high purity commercially valuable sulfur by-product.

All or a portion of the sulfur trioxide may be directed to an absorbing tower 35 in which the highly concentrated sulfur trioxide is contacted immediately with a quenching aqueous sulfuric acid solution from a sulfuric acid storage vessel 37. Aqueous sulfuric acid is pumped from the storage vessel 37 through an absorbent feed line 40 to the absorbing tower to contact the sulfur trioxide in a countercurrent manner to absorb the sulfur trioxide to form a highly concentrated sulfuric acid or oleum. Water is fed to the feed line 40 through a line 43. The sulfuric acid or oleum product is removed through product line 44. By utilizing this process, commercially valuable sulfuric acids and oleums of almost any concentration may be obtained. Any sulfur dioxide and oxygen passing unaffected through the absorbing tower 35 may be added to the gases from the reactor 32 or added to the flue gases entering unit 10 (not shown).

If it is desired to form liquid sulfur from the sulfur trioxide then at least a portion of the sulfur trioxide is passed through line 48 to a converter 46 having a fluidized carbon bed. Heat is applied by heater 52 to reduce the sulfur trioxide first to sulfur dioxide and then to reduce the sulfur dioxide to gaseous sulfur and carbon dioxide according to the following formulae:

$$SO_3 \xrightarrow{heat} SO_2 + \tfrac{1}{2}O_2 \tag{11}$$

$$SO_2 + C \xrightarrow{heat} S + CO_2 \tag{12}$$

The carbon is fed to the converter through line 47. Sulfur and carbon dioxide are passed through a condensor 53 to liquify the sulfur. The molten elemental sulfur is removed from the condensor through line 54 as a valuable by-product.

The carbon dioxide leaves the condensor through line 56 and is directed to the stack 20 for emission to the atmosphere.

If the process is being used to remove sulfur oxides from flue gas of a zinc refining smelter, then it may be desirable to direct the high purity sulfur trioxide through line 58 to a reactor 60 to react the sulfur trioxide directly with particles of zinc oxide (ZnO) at approximately 427° C. to form zinc sulfate ($ZnSO_4$) according to the formula:

$$SO_3 + ZnO \xrightarrow{427°\,C} ZnSO_4 \tag{13}$$

The produced zinc sulfate can then be solubilized in water and blended with the feed to an electrolytic zinc recovery plant.

This process has particular economical advantages when it is operated as a continuous system with the molten liquid potassium sulfate salt mixture being continuously circulated through the contactor 10 and the electrolytic regenerator 26. In such a continuous regeneration system, it is necessary to circulate the molten solutions at rates sufficient to maintain the molten liquid salt mixture unsaturated with sulfur trioxide in which the potassium normal sulfate content never approaches zero. It is preferable to operate at rather steady state conditions in which the three components are maintained in the composition range by mole percent, of 60–80 potassium pyrosulfate, 5–20 potassium normal sulfate, and 5–20 vanadium pentoxide.

Should the molten potassium sulfate salt mixture become contaminated, the valuable vanadium pentoxide may be readily recovered by dissolving the salt mixture in water. Insoluble tetrovanadic acid ($H_2V_4O_{11}$) is formed which precipitates from the dissolved salt mixture. The reaction is as follows:

$$sV_2O_5 + H_2C \rightarrow H_2V_4O_{11}\downarrow$$

(14)

After the precipitated tetravanadic acid is removed from the agueous salt solution, the $V_2O_5$ may be regenerated by heating the tetravanadic acid sufficiently to decompose the tetravanadic acid to vanadium pentoxide and water vapor.

Without further elaboration, it is believed that one skilled in this art can, using the preceding description, utilize the present invention to its fullest extent.

For a 10 million scf/hr flue gas containing approximately 2,500 ppm sulfur trioxide, it is calculated that approximately 2,730 lb/hr of 100% $SO_3$ may be obtained. This is considering that the fused salt mixture has a combined oxidation and extraction efficiency of 98 percent. It is estimated that this can be accomplished by contacting the flue gas with approximately 31,400 lb/hr (1,500 gal/hr) of a molten liquid salt mixture having a mole percent composition of 68.9 $K_2S_2O_7$, 18.7 $K_2SO_4$ and 12.4 $V_2O_5$, and being circulated through a contactor 10 at a temperature of approximately 425° C. The molten salt mixture is circulated through the contactor (packed tower) at a 50 percent flooding velocity. The packed tower has a height of 14.6 ft. and a diameter of 7.3 ft. Approximately 13,700 lbs/hr (655 gal/hr) of the molten salt mixture is bled and circulated through the pyrolytic regenerator 26 to produce 2,730 lb/hr of the $SO_3$. At an electrolytic cell potential of 4 volts, approximately 1,354 kw-hr will be consumed.

Having above set forth a written description of my invention and a best mode contemplated for practicing the same, I now proceed with a definition of my invention for which I seek patent protection under the laws of the United States of America.

What I claim as my invention is:

1. A process for removing sulfur dioxide from a gaseous stream, comprising the steps of:
contacting the gaseous stream with a molten liquid homogeneous catalyst extraction salt mixture at a temperature between 400° C. and 500° C. having (1) a dissolved oxygen compound of vanadium to catalytically oxidize the sulfur dioxide to sulfur trioxide and (2) a dissolved potassium normal sulfate to solvate the sulfur trioxide to extract the sulfur trioxide from the gaseous stream and form a sulfur dioxide depleted gaseous stream and a sulfur trioxide loaded molten liquid salt mixture;

separating the sulfur trioxide loaded molten liquid salt mixture and the sulfur dioxide depleted gaseous stream before the molten salt mixture becomes saturated with sulfur trioxide; and electrolytically disassociating the separated sulfur trioxide loaded molten liquid salt mixture to produce a gaseous effluent of sulfur trioxide and to regenerate at least a portion of the potassium normal sulfate.

2. The sulfur dioxide removal process as defined in claim 1 further comprising the step of recycling the regenerated molten salt solution to the gaseous stream to form a continuous process of sulfur dioxide removal.

3. The sulfur dioxide removal process as defined in claim 1 wherein the separated sulfur trioxide loaded molten salt mixture is placed in an electrolytic cell having a cathode and an anode inserted into the molten mixture with an electrical potential applied across the cathode and anode to generate sulfur trioxide at the anode according to the formula:

$$S_2O_7 \rightarrow 2SO_3\uparrow + \tfrac{1}{2}O_2 + 2e.$$

4. The sulfur dioxide removal process as defined in claim 1 wherein the molten salt mixture contacts the gaseous stream at a temperature between 425° C. and 460° C.

5. The sulfur dioxide removal process as defined in claim 1 wherein the molten liquid homogeneous catalyst extraction salt mixture consists essentially of vanadium pentoxide, potassium normal sulfate and potassium pyrosulfate.

6. The sulfur dioxide removal process as defined in claim 3 further comprising the step of placing a porous ceramic membrane in the electrolytic cell between the anode and cathode that is pervious to potassium metal ions to permit the potassium metal ions to migrate through the membrane to the cathode.

7. The sulfur dioxide removal process as defined in claim 1 further comprising the step of contacting the effluent gaseous sulfur trioxide with zinc oxide at approximately 427° C. to form zinc sulfate.

* * * * *